United States Patent [19]

Takeuchi et al.

[11] Patent Number: 4,793,751

[45] Date of Patent: Dec. 27, 1988

[54] OPTI-MECHANICAL TORQUE INDICATING CONNECTING MEMBER

[75] Inventors: Hirosato Takeuchi; Osahiko Miyazaki; Yasuo Kazama; Naoya Kurihara, all of Tokyo, Japan

[73] Assignee: Nitto Kohki Co., Ltd., Japan

[21] Appl. No.: 79,431

[22] Filed: Jul. 30, 1987

[30] Foreign Application Priority Data

Sep. 29, 1986 [JP] Japan .................. 61-149091[U]

[51] Int. Cl.$^4$ .......................................... F16B 31/02
[52] U.S. Cl. .......................................... 411/13; 411/8
[58] Field of Search .................. 411/13, 14, 8–11

[56] References Cited

U.S. PATENT DOCUMENTS

| 2,879,686 | 3/1959 | Lewis et al. ........................ 411/14 |
| 3,602,186 | 8/1971 | Popenoe ........................... 411/13 |
| 3,799,108 | 3/1974 | Mosow ............................. 411/13 |
| 3,823,639 | 7/1974 | Liber .............................. 411/14 |
| 3,964,299 | 6/1976 | Johnson |
| 3,987,668 | 10/1976 | Popenoe ........................ 411/14 X |
| 3,987,699 | 10/1976 | Popenoe ........................ 411/13 |

FOREIGN PATENT DOCUMENTS

| 2746689 | 2/1979 | Fed. Rep. of Germany ......... 411/8 |
| 53-42058 | 4/1978 | Japan . |
| 497422 | 3/1976 | U.S.S.R. ........................ 411/13 |
| 913851 | 12/1962 | United Kingdom ............... 411/14 |
| 991783 | 5/1965 | United Kingdom ............... 411/14 |
| 1316899 | 5/1973 | United Kingdom . |
| 1419523 | 12/1975 | United Kingdom . |

*Primary Examiner*—Gary L. Smith
*Assistant Examiner*—Curtis B. Brueske
*Attorney, Agent, or Firm*—Nixon & Vanderhye

[57] ABSTRACT

A connecting member comprises a rod-shaped body having a head and/or thread on the outer periphery for integrally connecting a plurality of members and a containing hole opened at one end thereof and extended longitudinally, a rod disposed in the hole so as to fix at its inner end to the inner end of the hole, a transmissive window fixed to the opening of the hole, and a fluid holding member holding a colored fluid and pressed by the open side end of the rod on the window. When a longitudinal strain developed in the body the rod release the holding member from under pressure so that colored fluid covers the open side end of the rod.

6 Claims, 3 Drawing Sheets

OPTI-MECHANICAL TORQUE INDICATING CONNECTING MEMBER

BACKGROUND OF THE INVENTION

The present invention relates to a connecting member used to integrally connect a plurality of members which are independent from one another and, more particularly, to a connecting member capable of visibly indicating the connection strength.

A connecting member having a rod shape, such as a screw or a bolt, and connecting means on its outer surface for connecting a plurality of members, is conventionally used to integrally connect a plurality of members which are independent from one another. The clamping torque of the connecting member must be sufficient so that, during use, the interconnection between it and the plural members does not loosen under vibration conditions and other factors. The connecting member must also be capable of being set to a predetermined limit value corresponding to the maximum torque which the connecting member can exert. Therefore, it is usually necessary to employ a special tool such as a torque wrench so as to obtain a reliable indication of the torque exerted upon the plurality of members interconnected to the connecting member.

There also exists the possibility that the value of the clamping torque may decrease over time due to the periodic frequent variations in load forces exerted upon the plurality of integrated members during use. Thus, one can never be assured that the proper torque which is initially set by a torque wrench, will remain constant over time. Because of this, the clamping torque of the connecting member must be inspected periodically by a special tool, such as a torque wrench.

Therefore, significant time and labor are involved with these periodic inspections. This is especially true when there are a number of connecting members (such as bolts which must be inspected periodically), and when looseness and/or breakage of even one such connecting member cannot be tolerated from a safety viewpoint (e.g., in railroad track maintenance work, and periodic checks and maintenance of automobiles).

SUMMARY OF THE INVENTION

The present invention has for its object to provide a connecting member which can always set the connection strength of a predetermined value for optimum connection without using a special tool such as a torque wrench. Thus, the invention permits an operator to visually observe whether or not the connection strength of each connecting member has been weakened as compared with some predetermined value.

In order to achieve the above and other objects, there is provided according to the present invention a connecting member comprising a rod-shaped body having a containing hole, opened at one end face thereof and extending longitudinally. Connecting means are provided on the outer peripheral surface thereof so as to integrally connect a plurality of members which are independent from one another. A rod is disposed in the containing hole of the body and is fixed at the inside end thereof to the body so that the end of the rod located nearer to the open end of the containing hole relatively moves with respect to the inner surface of the containing hole of the body when a longitudinal strain is developed in the body. A light transmissive window member is fixed to the open end of the containing hole of the body with fluid holding means provided in the containing hole of the body for holding an opaque fluid (i.e., one which does not allow passage of at least part of the wavelength of light), immediately behind the back surface of the light transmissive window member. The color of the containing hole as visually observed from the exterior of the light transmissive window member is thus capable of changing in response to the change in the amount of the fluid between the end of the open side of the rod and the back surface of the light transmissive window member. This color change, in turn, occurs as a result of a predetermined longitudinal strain occurring in the body such that the end of the open side of the rod relatively moves with respect to the inner surface of the containing hole of the body.

In the connecting member constructed as described above according to the present invention, the end of the open side of the rod disposed in the containing opening of the body moves relative to the inner surface of the containing opening of the body in response to a longitudinal stress in the body. This longitudinal stress loaded upon the body increases proportionally to the magnitude of the clamping torque exerted upon the body within its elastic limit. As a result, the amount of the opaque fluid in the fluid holding means between the end of the open side of the rod and the back surface of the light transmissive window member varies. This variance in the fluid amount, in turn, causes a color change to occur in the containing hole which may be visually observed from the exterior of the light transmissive window member.

As is apparent from the above description, the change in the color is a visual indication that enables an operator to set the magnitude of the clamping torque loaded to the body at a predetermined value, and hence an indication that the predetermined force for integrally connecting the plurality of members has been achieved.

Therefore, the connecting member may be operated while observing the change in the color, and the clamping of a pressing member may be stopped when the color changes to a predetermined density indicating that the magnitude of the clamping torque loaded to the body (and hence the force for integrally connecting the plurality of members) has been set to a predetermined value.

In the case of employing a plurality of connecting members, the density of the color in all the plurality of connecting members may thus be periodically visually observed after the connecting members have been operated to ensure the color in all the connecting members has remained at the predetermined value. Therefore, an operator is capable of determining at a glance whether or not the clamping torque magnitude for each connecting member (and hence the force for integrally connecting the plurality of members) is being held at the predetermined value.

DETAILED DESCRIPTION OF THE PREFERRED EMBODIMENTS

Figure 1:
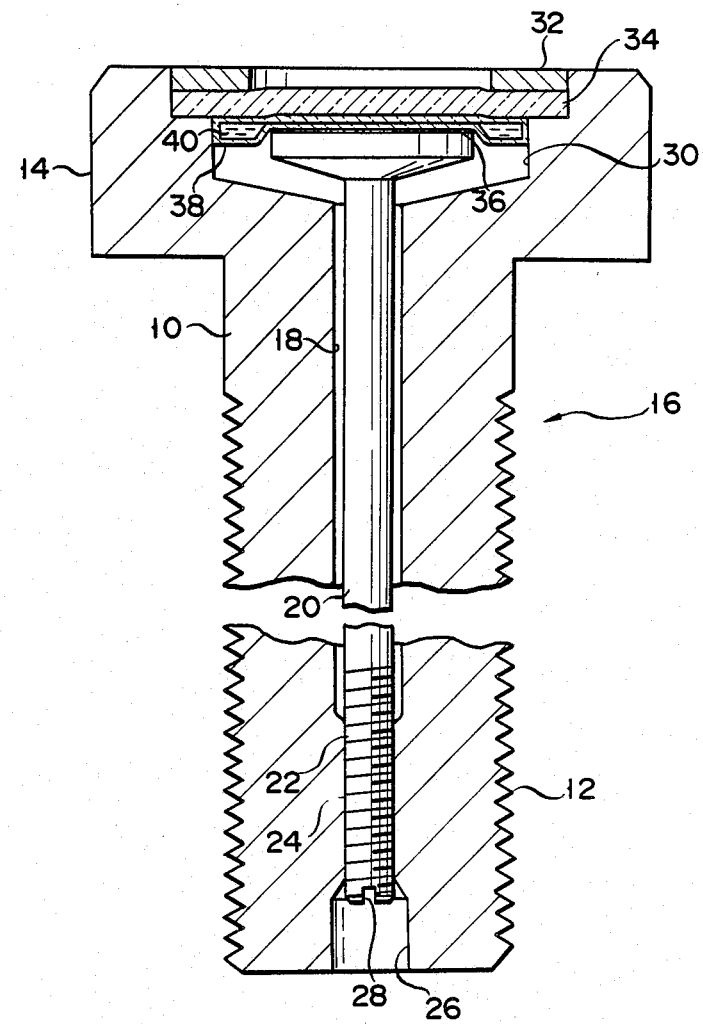
FIG. 1 is a schematic longitudinal sectional view showing a connecting member according to a first embodiment of the present invention in an unused state.

A connecting member according to a first embodiment of the present invention shown in FIG. 1 is headed bolt 16 having threaded portion 12 on the outer peripheral surface of rod-shaped body 10 and head portion 14 of polygonal shape such as a flat square or hexagonal shape. When bolt 16 is inserted into bolt inserting holes of a plurality of members, not shown, to be integrally connected, head portion 14 and threaded portion 12 engages with the outer surface of the member disposed at one outermost side and female threads formed in the bolt inserting holes of the member disposed at the other outermost side or a nut disposed on the outer surface of the other outermost side member, and functions as connecting means for integrally connecting the members.

Bolt 16 has containing hole 18 opened at the end face of body 10 located nearer to the head side and extended longitudinally and coaxially of body 10. Rod 20 is disposed in containing hole 18, and threaded portion 22 formed on the inner end portion of rod 20 is threadably engaged with threaded hole 24 formed in the inner end of containing hole 18 so as to extend longitudinally and coaxially of body 10. Threaded hole 24 is opened in coaxial recess 26 formed concentrically with body 10 at the threaded end face of body 10, and protruded a the end of threaded portion 22 of rod 20 into recess 26. A screwdriver engaging groove 28 is formed on the end face of threaded portion 22 of rod 20. When a screwdriver, not shown, is turned after the engagement of the end of the screwdriver with engaging groove 28 of rod 20, rod 20 can be forwarded or reversed in containing hole 18, thereby relatively displacing the head side end face of rod 20 in containing hole 18.

Even if a tensile strain occurs in bolt 16 due to tensile stress loaded to bolt 16 when a clamping force is applied to bolt 16 to integrally connect a plurality of members, not shown, the tensile stress is not loaded to rod 20 in containing hole 18, and the tensile strain does not occur in rod 20. Therefore, when the tensile strain occurs in bolt 16, the head side end face of rod 20 is relatively displaced in containing hole 18 from the opening of containing hole 18 toward the inner end thereof.

The opening of containing hole 18 is provided with a spot facing so that an enlarged opening portion 30 having a diameter larger than that of the inner portion of containing hole 18 is formed and a light transmissive window member 34 formed of synthetic resin or glass for transmitting a light is fixed by an annular cover 32 to the opening of enlarged opening portion 30 to cover the opening of enlarged opening portion 30. The head side end face of rod 20 disposed in enlarged opening portion 30 inwardly from window member 34 forms indication surface 36 formed in a disc shape and colored with, for preferably, a relatively remarkable color or light reflecting color such as red or yellow or silver.

Flat bag-like fluid holding member 38 formed of a material having an elasticity and transmitting a light is disposed between the back surface of window member 34 and indication surface 36 of rod 20. Fluid holding member 38 has a diameter larger than indication surface 36 of rod 20, and contains fluid 40 which does not allow passage at least part of wavelength of a light. Fluid 40 is colored with dark color such as dark blue or black contrary to the color of indication surface 36 in this embodiment. Fluid 40 is not a material which is adhered to the inner surface of fluid holding member 38 to color it or discolor it.

Fluid holding member 38 is pressed on the back surface of window member 34 by indicating surface 36 of rod 20 until the open side end face (i.e., indication surface 36) of rod 20 moves a predetermined distance toward the inner end of containing hole 18 in the enlarged opening portion 30 due to a tensile strain of a predetermined value exerted upon bolt 16. Since dark color fluid 40 is discharged from the central portion of fluid holding member 38 sandwiched by the back surface of window member 34 and indicating surface 36 of rod 20 to the peripheral edge portion of fluid holding member 38, indication surface 36 of rod 20 can be externally observed through window member 34.

Figure 2:
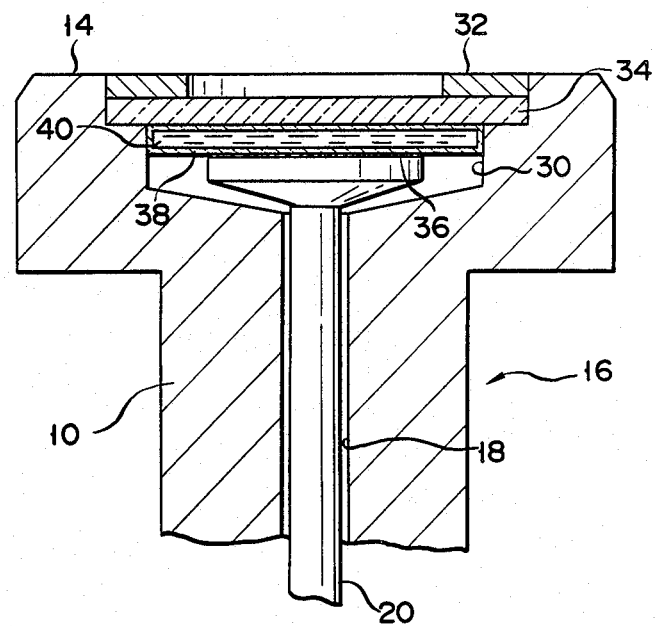
FIG. 2 is a schematic longitudinal sectional view showing the connecting member of FIG. 1 in the state when integrally connecting a plurality of members.

When open side end (i.e., indication surface 36) of rod 20 moves at a predetermined distance toward the inner end of containing hole 18 in enlarged opening portion 30 due to tensile strain of a predetermined value exerted upon in bolt 16, the pressing force loaded on fluid holding member 38 by indication surface 36 of rod 20 so as to press fluid holding member 20 to the back surface of window member 34 is weakened and a space is formed at a central portion in fluid holding member 38, as shown in FIG. 2. At this time, dark color fluid 40 flows from the peripheral edge portion of fluid holding member 38 to the central portion of fluid holding member 38, and thereby indication surface 36 of rod 20 can not be externally observed through window member 34.

When the magnitude of tensile force loaded to bolt 16 to cause bolt 16 to be deformed at a predetermined value falls within the elastic limit of bolt 16, the change between the observation enabling state of indication surface 36 and the observation disabling state thereof due to the introduction or discharge of fluid 40 to or from indication surface 36 of rod 30, i.e., the change in the color in containing hole 18, is reversible.

Fluid 40 contained in fluid holding member 38 does not contaminate the worker and the surroundings of bolt 16 when bolt 16 is manufactured or used, nor colors or discolor the back surface of window member 34 or indication surface 36 of rod 20.

The value of a predetermined tensile stress, loaded to bolt 16 when the change from the indication surface observation enabling state to the indication surface observation disabling state in window member 34 occurs, can be altered by changing the engaging amount of threaded portion 22 of rod 30 to the inner end of threaded hole 24 of containing hole 18. In the embodiment described above, the engaging amount of threaded portion 22 of rod 20 can be varied by the rotation of a screwdriver, not shown, in either direction after making the screw driver engage with groove 28 at the end face of threaded portion 22 of rod 30 protruded into recess 26 of body 10. After the engaging amount of threaded portion 22 of rod 20 is once determined, threaded portion 22 of rod 20 is fixed with a bonding agent.

According to the embodiment described above, the value of tensile stress loaded to bolt 16 necessary to change from the indication surface observation enabling state to the indication surface observation disabling state in window member 34 can be changed by turning rod 20 in either direction after bolt 16 is completely assembled, and the value of tensile stress necessary to change the state can be always set constantly irrespective of the presence of manufacturing error in the dimensions of various components of bolt 16.

When a plurality of members, not shown, are integrally connected by bolt 16 constructed as described in detail as above, bolt 16 is inserted into bolt inserting opening of the plurality of members, not shown, so as to make head portion 14 of bolt 16 engage with the outer surface of the member disposed at one outermost side, and to make threaded portion 12 of bolt 16 threadably engage with female threads formed in the bolt inserting hole of the member disposed at the other outermost side or a nut disposed on the outer surface of the other outermost side member. Here, a clamping torque is further continuously loaded to bolt 16 while observing light transmissive window member 34, and the load of the clamping torque to bolt 16 is stopped as indication surface 36 of rod 20 in window member 34 is covered by fluid 40. This means that a predetermined connecting force necessary to preferably integrally connect the plurality of members, not shown, occurs at bolt 16.

Even if there is a large possibility that the connecting force of bolt 16 tends to be weakened by the frequent changes in the force loaded to the plurality of integrated members during usage of the plurality of integrated members even after the plurality of members have been once preferably integrally connected by bolt 16 as described above, and periodic inspection is needed in a view point of safety as in the case of an automobile or railroad track maintenance work, inspection for that whether indication surface 36 of rod 20 in light transmissive window member 34 is covered with fluid 40 or not is only needed.

Figure 3:
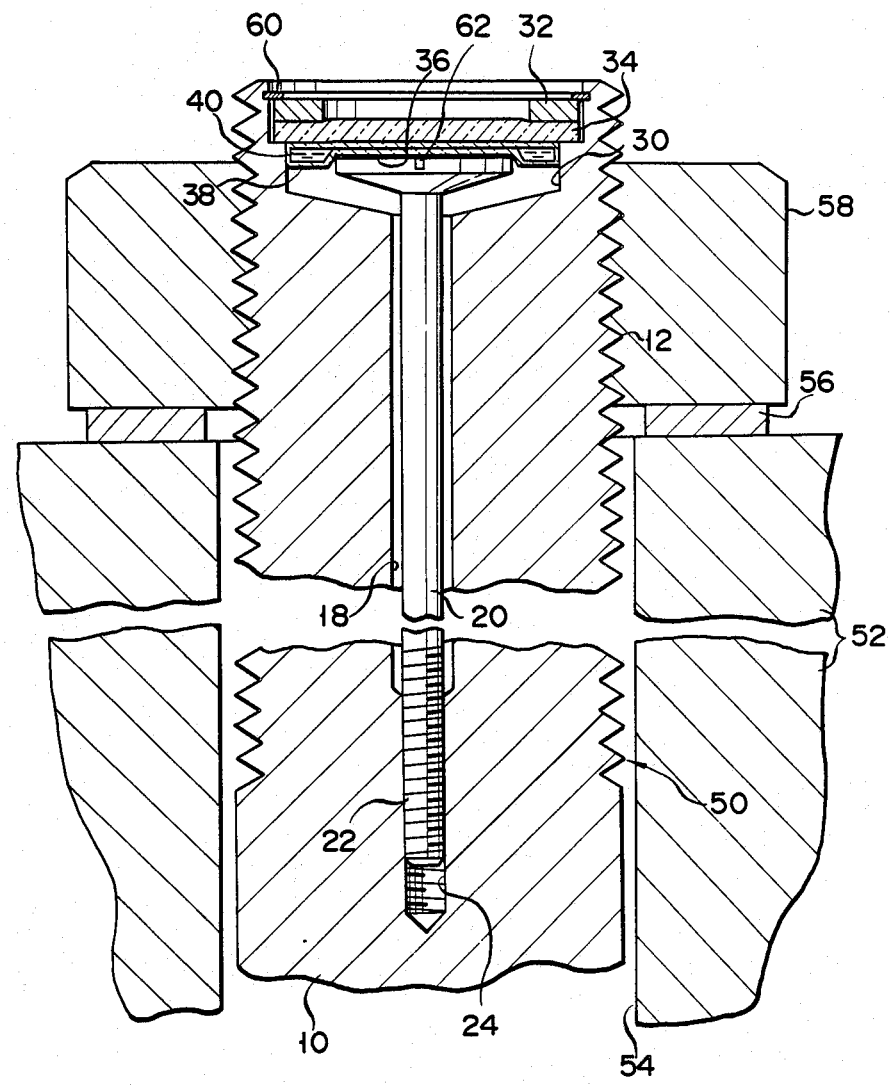
FIG. 3 is a schematic longitudinal sectional view showing a connecting member according to the second embodiment of the present invention at a state immediately before the clamping work is started, the connecting member being inserted to the plurality of members to be integrally connected.

FIG. 3 shows a connecting member according to a second embodiment of the present invention. In this embodiment, the same reference numerals as in the first embodiment in FIGS. 1 and 2 (but with prime designations) denote the same parts in the second embodiment, and the detailed description thereof will be omitted.

A connecting member according to a second embodiment is a stud bolt 50 implanted at the lower end to a base, not shown. Threaded portion 12' is formed on the outer peripheral surface of rod-shaped body 10' of stud bolt 50 in a portion protruded from the base, not shown. Stud bolt 50 is inserted into bolt inserting hole 54 formed in member 52 to be rigidly clamped to the base. The protruding end of threaded portion 12' of stud bolt 50 protruded from bolt inserting hole 54 is attached with washer 56, and is also engaged at the top of washer 56 with nut 58. In this embodiment, containing hole 18' is opened at its enlarged opening portion 30' in the protruding end of stud bolt 50. Annular cover 32' and light transmissive window member 34' are detachably fixed to the opening port of enlarged opening portion 30' by stop ring 60. In this embodiment, a groove 62 for engaging the end of a screwdriver, not shown, is further formed on indication surface 36' of rod 20'.

In the second embodiment described above, when nut 58 is turned to press member 52 on the upper surface of the base, not shown, until indication surface 36' of rod 20' in window member 34' is covered by fluid 40', member 52 is integrally connected with the base, not shown, by a predetermined connecting force. Whether member 52 is integrally connected to the base, not shown, by a predetermined force or not can be confirmed merely by inspecting whether indication surface 36' of rod 20' in window member 34' is covered with fluid 40' or not at periodic inspection time.

In the second embodiment described above, when stop ring 60 is removed from the opening of enlarged opening 30', first of all annular cover 32', and window member 34' are removed from the opening of enlarged opening portion 30'. A screwdriver, not shown, is then engaged at its end with the groove 62 of indication surface 36' of rod 20' and rod 20' is turned in either direction by the screwdriver, so that the relative position of indication surface 36' of rod 20' can be displaced in the direction along the longitudinal direction of body 10' in enlarged opening portion 30'. The advantages of the second embodiment described above are the same as those obtained when turning rod 20 in either direction in the first embodiment.

The above-mentioned various embodiments have been described for the present invention. The present invention is not limited to the particular embodiments. Various other changes and modifications may be made within the spirit and scope of the present invention.

For example, the connecting member to which the present invention is applied may be a rivet, other types of bolts and screws except the type described above.

Further, the inner end of the rod may be directly fixed to the body by using various other known fixing means, and may be integrally formed with the body.

In the second embodiment described above, after the relative position of indication surface 36 of rod 20 in enlarged opening portion 30 of containing hole 18 is once set to a predetermined position, annular cover 32 and light transmissive window member 34 may be fixed directly to the opening of enlarged opening portion 30 without using stop ring 60.

What is claimed is:

1. A connecting member for integrally connecting a plurality of independent members comprising:
   a rod-shaped body having a longitudinally extending containing hole having an inner surface which is opened at one end face thereof, and connecting means provided on an outer peripheral surface thereof so as to integrally connect said plurality of independent members;
   a rod disposed in the containing hole of the body and fixed at one end thereof to the body so that an opposite end of the rod located nearer to the opened end of the containing hole is relatively moveable with respect to the inner surface of the containing hole of the body when a longitudinal strain is exerted upon the body;
   a light transmissive window member fixed to and covering the open end of the containing hole of the body; and
   fluid holding means provided within the containing hole of the body immediately behind a rear surface of said light transmissive window member for holding a substantially opaque fluid, said fluid holding means for causing a color change to be visibly perceptible through the light transmissive window member in response to a change in the amount of fluid held by said fluid holding means between the end of the open side of the rod and the rear surface of the light transmissive window member when a predetermined longitudinal strain is exerted upon the body due to said opposite end of the rod located nearer said open end of said containing hole being moved relative to the inner surface of the containing hole of the body, wherein the inner end of the rod is threadably engaged with the inner end of the containing hole of the body; and wherein the inner end of the rod is exposed at the other end of the body.

2. A connecting member according to claim 1, wherein said fluid holding means is formed of a light transmissive material having an elasticity, disposed between the open side end face of the rod and the light transmissive window member, and pressed on the inner surface of the light transmissive window member by the open side end face of the rod so as to discharge the fluid from between the open side end of the rod and the light transmissive window member until the open side end of the rod relatively moves at a predetermined distance from the open end of the containing hole toward the inner end of the containing hole due to a predetermined tensile strain occurred in the body.

3. A connecting member according to claim 1, wherein said fluid has a color which contrasts with to the color of the open side end of the rod.

4. A connecting member according to claim 3, wherein the open side end of the rod is colored with a relatively remarkably bright color or a light reflecting color, and the fluid has a dark color or a color for absorbing light.

5. A connecting member according to claim 1, wherein said light transmissive widow member is detachably fixed to the opening of the containing hole of the body.

6. A connecting member comprising:

a body having a head portion at one of its ends and defining an axially elongate central bore having an open end at said head portion;

said body also having an axial recess at its other end;

an indicator rod received within said elongate central bore and having a lower end threadably engaged with another end of said body, opposite to said one end thereof, in such a manner that a portion of said indicator rod extends into said axial recess of said body, and said indicator rod also defining an indicator surface at an upper end thereof such that said indicator surface is disposed near said open end of said elongate central bore;

a transparent window fixed to said body in covering relationship to said open end of said elongate central bore;

fluid holding means for containing a substantially opaque liquid between said indicator surface of said indicator rod and said transparent window;

said indicator surface of said indicator rod normally pressing against said fluid holding means in response to a predetermined tension force being exerted upon said body to thereby cause a portion of the liquid in said fluid holding means to flow from a central region thereof to a marginal region thereof so as to thereby decrease an amount of fluid disposed between said indicator surface and said transparent window, whereby said indicator surface becomes more visible through said transparent window; and said portion of said indicator rod which extends into said recess includes means defining surfaces for accepting a turning tool to allow said indicator rod to be manually adjustably turned which responsively causes said rod to be axially displaced within said central bore due to the threaded engagement between said lower end of said rod and said other end of said body so as to bring said indicator surface into greater or lesser contact with said fluid holding means and thus permit said indicator surface to be more or less visible through said transparent window, thereby permitting adjustable selection of said predetermined tension force which is indicated by means of said indicator surface.

* * * * *